United States Patent
Childers

(10) Patent No.: US 10,466,017 B1
(45) Date of Patent: Nov. 5, 2019

(54) ARMOR PANEL FOR FEMALE VESTS

(71) Applicant: Chad Childers, Fort Myers, FL (US)

(72) Inventor: Chad Childers, Fort Myers, FL (US)

(73) Assignee: SURVIVAL ARMOR, INC., Fort Myers, FL (US)

( * ) Notice: Subject to any disclaimer, the term of this patent is extended or adjusted under 35 U.S.C. 154(b) by 616 days.

(21) Appl. No.: 15/016,324

(22) Filed: Feb. 5, 2016

(51) Int. Cl.
  *F41H 1/02* (2006.01)
  *F41H 5/04* (2006.01)
  *D05B 93/00* (2006.01)
  *D05B 21/00* (2006.01)

(52) U.S. Cl.
  CPC ............ *F41H 5/0471* (2013.01); *D05B 21/00* (2013.01); *D05B 93/00* (2013.01); *F41H 1/02* (2013.01)

(58) Field of Classification Search
  CPC ......... F41H 1/02; F41H 5/0471; D05B 21/00; D05B 93/00
  See application file for complete search history.

(56) References Cited

U.S. PATENT DOCUMENTS

| | | |
|---|---|---|
| 4,183,097 A | 1/1980 | Mellian |
| 4,578,821 A | 4/1986 | Zufle |
| 5,020,157 A | 6/1991 | Dyer |
| 5,943,694 A | 8/1999 | Moureaux et al. |
| 6,281,149 B1 | 8/2001 | Hussein et al. |
| 7,739,753 B2 | 6/2010 | Jankowski |
| 8,980,773 B2 | 3/2015 | Chiou et al. |
| 2009/0255022 A1* | 10/2009 | Smith ............... B29C 43/20 2/2.5 |

* cited by examiner

*Primary Examiner* — Anna K Kinsaul
(74) *Attorney, Agent, or Firm* — Edward M. Livingston, Esq.; Bryan L. Loeffer, Esq.; Livingston Loeffler, P.A.

(57) ABSTRACT

A chest armor panel (1) for female body armor vests wherein the breast cups (10A, 10B) of the armor panel are specially layered so that stitching lines (8) are offset from each other and covered by intermediary layers of non-stitched ballistic fabric or apex covers (26) to enhance the performance of the vest.

1 Claim, 2 Drawing Sheets

ARMOR PANEL FOR FEMALE VESTS

FIELD OF THE INVENTION

This invention relates to body armor vests, and more particularly to a chest armor panel for female body armor vests wherein the breast cups of the armor panel are specially layered to enhance the performance of the vest.

BACKGROUND OF THE INVENTION

Soft body armor is often worn by law enforcement personnel to protect against the ballistic impact of projectiles such as bullets. Soft body armor is generally made with flexible ballistic fabric woven from ballistic fibers. To form the breast cups for female chest plates made using fabric, the material is stitched to form "darts" or wedge-shaped folds of fabric that are stitched in a triangular pattern. Multiple darts may be required to form the breast cups meaning that multiple lines of stitching may be stacked on top of each other, especially near the center or apex of each breast cup where the stitching lines converge.

Therefore, a need exists for a chest armor panel for female body armor vests wherein the breast cups of the armor plate are specially layered so that any stitching lines are offset from each other and covered by intermediary layers of non-stitched ballistic fabric to enhance the performance of the vest.

The relevant prior art includes the following references:

| Pat. No. (U.S. Patent References) | Inventor | Issue/ Publication Date |
| --- | --- | --- |
| 5,020,157 | Dyer | Jun. 4, 1991 |
| 6,281,149 | Hussein et al. | Aug. 28, 2001 |
| 5,943,694 | Moureaux et al. | Aug. 31, 1999 |
| 4,578,821 | Zufle | Apr. 1, 1986 |
| 8,980,773 | Chiou et al. | Mar. 17, 2015 |
| 4,183,097 | Mellian | Jan. 15, 1980 |
| 7,739,753 | Jankowski | Jun. 22, 2010 |

SUMMARY OF THE INVENTION

The primary object of the present invention is to provide a chest armor panel for female body armor vests wherein the breast cups of the armor panel are specially layered so that stitching lines are offset from each other and covered by intermediary layers of ballistic fabric to enhance the performance of the vest.

The present invention fulfills the above and other objects by providing an armor panel for a female body armor vest and system and method for making same wherein the armor panel has a plurality of packs having specially placed lines of stitching used to form darts that form breast cups for comfort and support of the wearer. Darts are created by stitching out a triangular-shaped wedge-shaped fold of fabric. The plurality of packs may each have one or more layers of ballistic fabric forming each pack. The lines of stitching forming each dart on a particular pack are preferably offset from the lines of stitching forming darts on any other packs making up the armor panel. This allows each line of stitching to be covered and/or backed by at least one pack wherein an unstitched portion of ballistic fabric is backing the line of stitching.

The lines of stitching of each pack converge in the center or apex of each breast cup. Therefore, each apex preferably has one or more preferably circular-shaped intermediary layers of ballistic material covering and/or backing the one or more packs.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
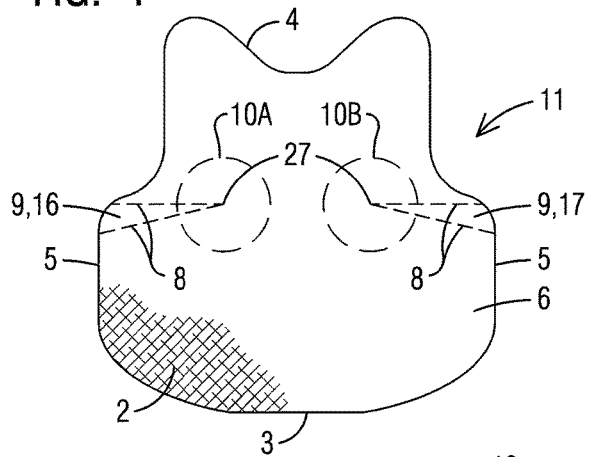
FIG. 1 is a front view of a first inner layer of a chest armor plate of the present invention.
Figure 4:
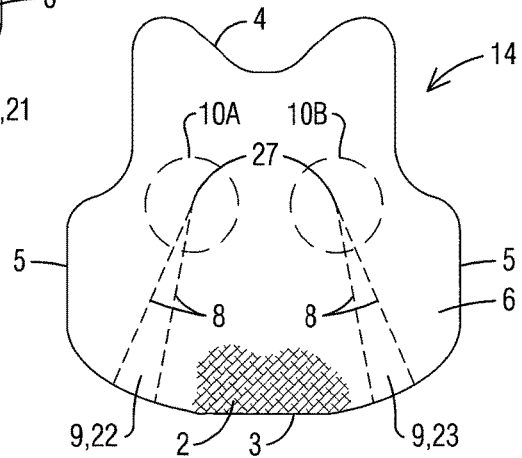
FIG. 4 is a front view of a fourth inner layer of a chest armor plate of the present invention.
Figure 5:
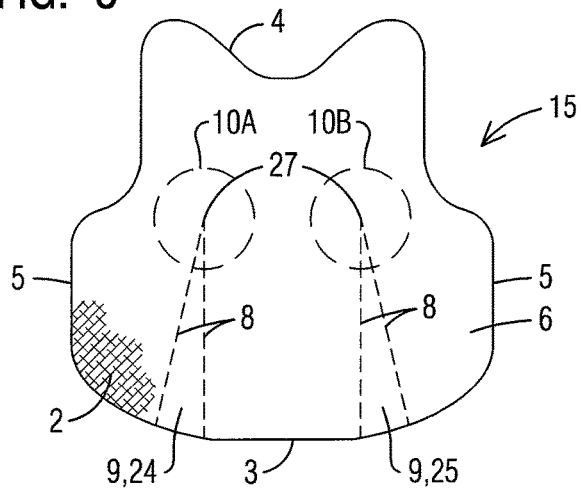
FIG. 5 is a front view of a fifth inner layer of a chest armor plate of the present invention.
Figure 6:
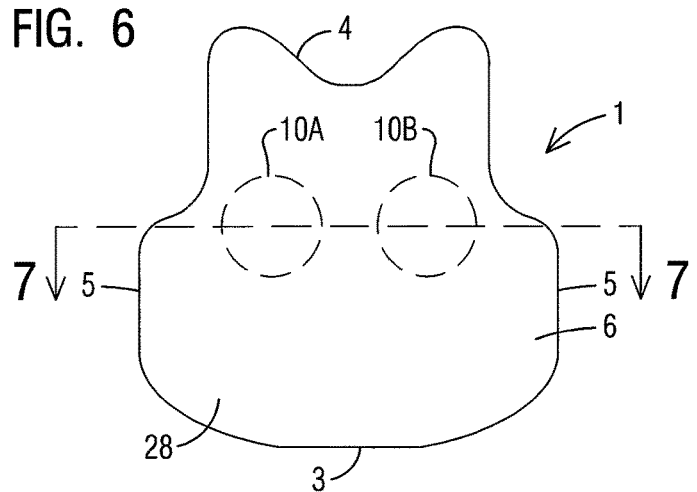
FIG. 6 is a front view of an assembled chest armor plate of the present invention having an outer cover.
Figure 7:
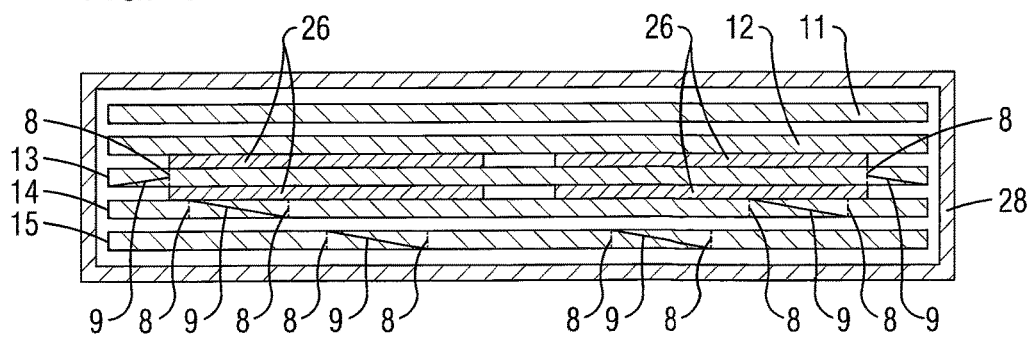
FIG. 7 is a cross sectional view along line 7-7 of FIG. 6.

For purposes of describing the preferred embodiment, the terminology used in reference to the numbered accessories in the drawings is as follows:

1. armor panel
2. ballistic fabric
3. bottom edge of a pack
4. top edge of a pack
5. side edge of a pack
6. interior surface of a pack
7. exterior surface of a pack
8. line of stitching
9. dart
10A. right side breast cup
10B. left side breast cup
11. first pack
12. second pack
13. third pack
14. fourth pack
15. fifth pack
16. first right side dart
17. first left side dart
18. second right side dart
19. second left side dart
20. third right side dart
21. third left side dart
22. fourth right side dart
23. fourth left side dart
24. fifth right side dart
25. fifth left side dart
26. apex cover
27. apex
28. outer covering With reference to FIGS. 1-7, the armor panel 1 for a female body armor vest of the present invention comprises a plurality of packs 11-15 each having a bottom edge 3, a top edge 4, side edges 5, an interior surface 6 and an exterior surface 7. Each pack 11-15 is formed of at least one layer of ballistic fabric 2. One or more lines of stitching 8 are located on each pack 2 to form a dart 9 that in turn forms a right side breast cup 10A and a left side breast cup 10B on the armor panel 1 for comfort and support of the wearer. The darts 9 are formed by making triangular-shaped folds in the ballistic fabric of each pack 2 and by placing one or more lines of stitching 8 to hold the triangular-shaped folds in place. As illustrated in FIGS. 6 and 7B, the armor panel comprises five packs 11-15, which are each illustrated in FIGS. 1-5. The lines of stitching 8 forming the darts and the five packs 11-15 are preferably offset from each other. This allows each line of stitching 8 to be covered and/or backed by at least one pack 2 wherein an unstitched portion of ballistic fabric is aligned with each line of stitching 8.

For example, as illustrated in FIG. 1, the stitching lines 8 of a first right side dart 16 and of a first left side dart 17 are each located on first pack 11 in a position that is substantially perpendicular to the bottom edge 3 of the first pack 11.

Figure 2:
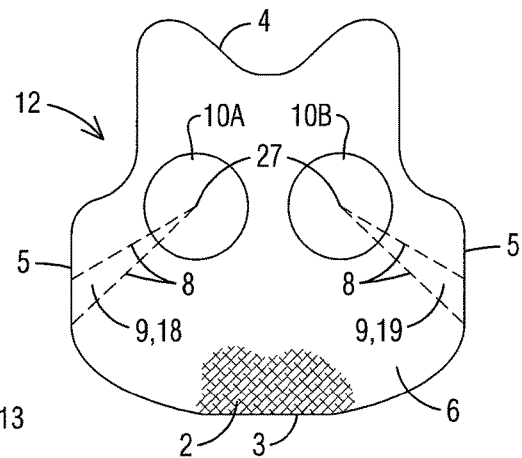
FIG. 2 is a front view of a second inner layer of a chest armor plate of the present invention.

Then, as illustrated in FIG. 2, the stitching lines 8 of a second right side dart 18 and of a second left side dart 19 are each located on the second pack 12 are each angled to be in an offset from the stitching lines 8 of the first pack 11 when the first pack 11 and the second pack 12 are stacked on each other.

Figure 3:
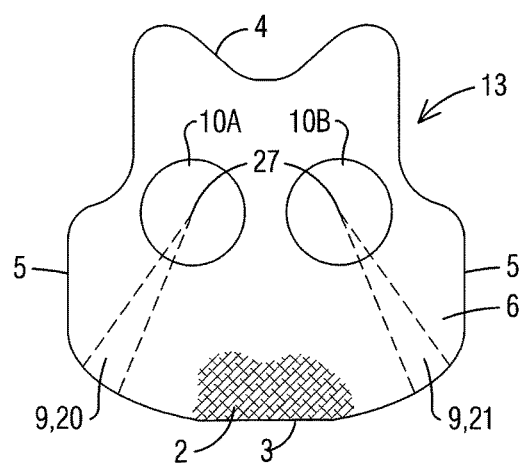
FIG. 3 is a front view of a third inner layer of a chest armor plate of the present invention.

Then, as illustrated in FIG. 3, the stitching lines 8 of a third right side dart 20 and of a third left side dart 21 are each located on the third pack 13 are each angled to be in an offset position from the stitching lines 8 of the first pack 11 and the second pack 12 when the first pack 11 and the second pack 12 are stacked on third pack 13.

Then, as illustrated in FIG. 4, the stitching lines 8 of a fourth right side dart 22 and of a fourth left side dart 23 are each located on the fourth pack 14 are each angled to be in an offset position from the stitching lines 8 of the first pack 11, the second pack 12 and the third pack 13 when the first pack 11, the second pack 12 and the third pack 13 are stacked on fourth pack 14.

Finally, as illustrated in FIG. 5, the stitching lines 8 of a fifth right side dart 24 and of a fifth left side dart 25 are each located on the fifth pack 15 are each angled to be in an offset position from the stitching lines 8 of the first pack 11, the second pack 12, the third pack 13 and the fourth pack 14 when the first pack 11, the second pack 12, the third pack 13 and the fourth pack 14 are stacked on fifth pack 15.

With regard to FIGS. 2 and 3, apex covers 26 are illustrated. The lines of stitching 8 of each pack 1-5 converge in a center or apex 27 of each breast cup 10. The lines of stitching 8 of each pack 1-5 eventually intersect on the apexes 27 of each breast cup 10A and 10B. Therefore, each apex 27 is covered and/or backed with one or more preferably circular-shaped apex covers 26 of ballistic material.

The packs 11-15 may be encased in an outer covering 28.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A chest armor panel for a female body armor vest comprising:
   a plurality of packs each having a bottom edge, a top edge, side edges, an interior surface and an exterior surface;
   each of the one of plurality of packs being formed of at least one layer of ballistic fabric;
   at least one line of stitching located on each of the one of plurality of packs forming a dart on each of the one of plurality of packs and a right side breast cup;
   at least one line of stitching located on each of the one of plurality of packs forming a dart on each of the one of plurality of packs and a left side breast cup;
   said at least one line of stitching located on each of the one of plurality of packs forming the dart on each of the one of plurality of packs and the right side breast cup converge to form a first apex centrally located on the right side breast cup;
   a first circular-shaped apex cover covering the first apex located on the right side breast cup;
   said at least one line of stitching located on each of the one of plurality of packs forming the dart on each of the one of plurality of packs and the left side breast cup converge to form a second apex centrally located on the left side breast cup;
   a second circular-shaped apex cover covering the second apex located on the left side breast cup; and
   said first circular-shaped apex cover extending outward from the first apex and terminating prior to making contact with the left side breast cup; and
   said second circular-shaped apex cover extending outward from the second apex and terminating prior to making contact with the right side breast cup.

* * * * *